(12) United States Patent
Davis et al.

(10) Patent No.: US 6,993,588 B2
(45) Date of Patent: Jan. 31, 2006

(54) SYSTEM AND METHODS FOR SECURELY PERMITTING MOBILE CODE TO ACCESS RESOURCES OVER A NETWORK

(75) Inventors: Donald T. Davis, Somerville, MA (US); David A. Kranz, Arlington, MA (US); Elizabeth A. Martin, Newton, MA (US)

(73) Assignee: Sumisho Computer Systems Corporation, Tokyo (JP)

( * ) Notice: Subject to any disclaimer, the term of this patent is extended or adjusted under 35 U.S.C. 154(b) by 836 days.

(21) Appl. No.: 09/818,302

(22) Filed: Mar. 27, 2001

(65) Prior Publication Data

US 2002/0138634 A1 Sep. 26, 2002

Related U.S. Application Data

(60) Provisional application No. 60/278,828, filed on Mar. 26, 2001.

(51) Int. Cl.
*G06F 15/16* (2006.01)
*G06F 11/30* (2006.01)
*G06F 7/00* (2006.01)

(52) U.S. Cl. .................. 709/229; 713/201; 340/5.8
(58) Field of Classification Search ................ 709/239, 709/245, 217, 229; 713/201, 161; 340/5.8
See application file for complete search history.

(56) References Cited

U.S. PATENT DOCUMENTS

| | | | | |
|---|---|---|---|---|
| 5,983,348 A | * | 11/1999 | Ji | 713/200 |
| 6,092,194 A | * | 7/2000 | Touboul | 713/200 |
| 6,208,995 B1 | * | 3/2001 | Himmel et al. | 707/104.1 |
| 6,321,267 B1 | * | 11/2001 | Donaldson | 709/229 |
| 6,571,338 B1 | * | 5/2003 | Shaio et al. | 713/201 |
| 6,728,886 B1 | * | 4/2004 | Ji et al. | 713/201 |
| 6,754,621 B1 | * | 6/2004 | Cunningham et al. | 704/219 |

(Continued)

FOREIGN PATENT DOCUMENTS

EP 1081918 A2 * 3/2001

(Continued)

OTHER PUBLICATIONS

Java security: from HotJava to Netscape and beyond□□Dean, D.; Felten, E.W.; Wallach, D.S. □□Security and Privacy, 1996. Proceedings., 1996 IEEE Symposium on, vol., Iss., May 6-8, 1996. pp.: 190-200.*

(Continued)

*Primary Examiner*—Ario Etienne
*Assistant Examiner*—Uzma Alam
(74) *Attorney, Agent, or Firm*—Finnegan Henderson Farabow Garrett & Dunner LLP

(57) ABSTRACT

A system and methods are disclosed that permit mobile code, such as an applet, to create a network connection with a content server on a network, without exposing the client computer that is running the applet, or other computers with which the client computer may communicate, to a DNS spoofing attack. This is achieved in accordance with the principles of the present invention by using network restriction software in the execution engine or runtime system under which the applet executes. When the applet attempts to create a network connection to a content server, the network restriction software checks a "name directory" on the content server for the presence of an entry whose name corresponds to the name of the computer from which the applet was downloaded. If such an entry is present, then the network restriction software permits the network connection between the applet and the content server to be created. If not, the applet may not create a network connection with the content server. Additionally, address checks may be applied to assist in preventing DNS spoofing attacks from succeeding.

32 Claims, 5 Drawing Sheets

U.S. PATENT DOCUMENTS

2002/0013910 A1 * 1/2002 Edery et al. ............... 713/201
2003/0110161 A1 * 6/2003 Schneider .................... 707/3

FOREIGN PATENT DOCUMENTS

WO     WO 98/21666     5/1998
WO     WO 99/30238     6/1999

OTHER PUBLICATIONS

Balfanz, D. and E.W. Felten, "A Java Filter," Technical Report, Department of Computer Science, Princeton University, Sep. 1997 (p. 1-7).

Gong, L., et al., "Going Beyond the Sandbox: An Overview of the New Security Architecture in the Java™ Development Kit 1.2," Paper presented at the USENIX Symposium on Internet Technologies and Systems, Monterey, CA (Dec. 1997).

Dean, D., et al., "Java Security: From HotJava to Netscape and Beyond," Paper presented at the IEEE Symposium on Security and Privacy, Oakland, CA (May 1996).

"Robots.txt Tutorial", PHD Software Systems, (1996-2002). Retrieved from the Internet <URL:http://www.searchengineworld.com/robots/robots_tutorial.htm>.

Panagiotis, C., "HOSTS.EQUIV(4)," *Man-cgi 1.11*, (1994). Retrieved from the Internet <URL:http://www.mcsr.olemiss.edu/cgi-bin/man-cgi?rhosts+4>.

Secure Computing with Java™: Now and the Future [online], Aug. 2001 [retrieved on Feb. 12, 2002]. Retrieved from the Internet <URL:http://java.sun.com/marketing/collateral/security.html>.

Curry, D.A., "Network Security" in *UNIX® System Security, A Guide for Users and System Administrators* (MA: Addison-Wesley Publishing Company, Inc.), pp. 63-85 (1992).

Garfinkel, S. and Spafford, G., "Networks and Security" in *Practical UNIX Security* (CA: O'Reilly & Associates, Inc.) pp. 221-253 (1992).

Kaufman, C., et al., "Authentication Systems" in *Network Security, Private Communication in a Public World* (NJ: PTR Prentice Hall), pp. 177-203 (1995).

Cheswick, W.R. and Bellovin, S.M., "Firewall Gateways," in *Firewalls and Internet Security: Repelling the Wily Hacker* (MA: Addison-Welsley Publishing Company), pp. 51-83 (1994).

* cited by examiner

SYSTEM AND METHODS FOR SECURELY PERMITTING MOBILE CODE TO ACCESS RESOURCES OVER A NETWORK

RELATED APPLICATION(S)

This application claims the benefit of U.S. Provisional Application No. 60/278,828, filed on Mar. 26, 2001.

The entire teachings of the above application are incorporated herein by reference.

BACKGROUND OF THE INVENTION

The growth of the Internet has led to the development of numerous technologies for the distribution of content over the World Wide Web. Among these technologies are systems that permit Web content to include executable code that is sent from a Web server to a Web client, where it is executed. Such "mmobile code" or "applets" allow content providers to distribute content that includes programmed behavior, which may be used in a variety of ways. Mobile code systems, such as Java (produced by Sun Microsystems of Palo Alto, Calif.), or Curl (provided by Curl Corporation of Cambridge, Mass.) may greatly enhance the experience of Web users by providing a relatively efficient way for highly interactive or media-rich content to be sent across the Web.

Although such mobile code systems provide access to highly desirable features, they also raise serious security issues. Including executable code in Web content exposes Web users to a variety of attacks. The same systems that provide an efficient way to distribute highly interactive or engaging content also provide a means to distribute malicious code, such as viruses, programs designed to steal information from user's computers, or other damaging programs. Even if such programs are not intentionally distributed, the use of mobile code opens the possibility that errors in executable Web content may have potentially disastrous results on the computers of Web users who view the content. These security issues are made worse by the fact that the highly interactive Web applications that can be designed using mobile code are particularly attractive to Web users, who may be easily induced to view Web pages containing mobile code.

To address these security issues, mobile code systems such as Java typically impose limits on which system resources may be accessed by applets. An applet will typically have only limited access to the file system on a client computer, the CPU, memory, the network resources available to the computer, and so on. Additionally, the programming languages associated with mobile code systems typically include features which enhance security, such as type safety and garbage collection, to prevent inappropriate use of operations on objects, unsafe access to memory resources, memory leakage, and other potential memory-related problems that may be exploited by malicious code.

Unfortunately, despite these efforts, it is difficult or impossible to create a usefull programming language or mobile code system that is completely free of security issues. A clever attacker can exploit minor security holes to effectively completely break the security of a mobile code system, and launch a variety of attacks. Additionally, it is possible to exploit standard network services, such as Domain Name Service (DNS) to assist in an attack using a mobile code system.

One such attack, which shall be referred to herein as a "DNS spoofing attack," uses a mobile code system, such as Java, plus the DNS system, to attack computers behind a computer network firewall. Such a firewall prevents unauthorized connections from being established between computers behind the firewall and computers outside of the firewall, and thereby prevents a direct attack against computers located behind the firewall. The DNS spoofing attack, which is described, for example, in "Java Security: From HotJava to Netscape and Beyond", Drew Dean, Edward W. Felten, and Dan S. Wallach, *Proceedings of 1996 IEEE Symposium on Security and Privacy* (Oakland, Calif.), May 1996, provides a way to indirectly attack computers located behind a firewall, if any of those computers accesses an innocent looking applet from an attacker's Web site.

As will be described in greater detail hereinbelow, the DNS spoofing attack works by an attacker making an applet available on a Web page. When a victim computer, located behind a firewall, accesses the Web page, and runs the applet, the applet attempts to create a network connection with a computer outside of the firewall using the name of the computer outside the firewall. To translate the name into a network address, a DNS lookup is performed. By controlling the address returned by the DNS lookup, the attacker can cause the applet to connect to a second victim computer, located behind the firewall, instead of a computer outside of the firewall. Once such a connection is established, the applet can be used to attack the second victim computer.

To prevent this type of attack from succeeding, Java permits an applet to create connections only with the computer from which the applet was downloaded. The address of that computer is determined by taking the numerical address from the packets of the applet itself, as it is being loaded. Thereafter, the applet may connect only to that exact numerical address. Thus, if an attacker puts a malicious applet on his Web server, that applet will only be able to connect back to the attacker's own Web server—it will not be able to establish a connection with another computer behind a firewall.

While this solution is effective at preventing a DNS spoofing attack from succeeding, it also may severely limit the functionality of applets. There are many instances in which it would be useful for an applet to access resources across the Internet on computers other than the computer from which the applet was downloaded, such as other computers associated with the same service provider from which the applet was downloaded. Since accessing such resources requires that a network connection be established between the computer that is running the applet, and the computer on which the resources are to be accessed, such access is prevented by Java's solution to the DNS spoofing attack, unless the resources are available from the exact computer from which the applet was downloaded.

Additionally, the method that is used by Java to prevent a DNS spoofing attack may not be usable by other mobile code systems. The Java runtime system is typically tightly integrated with a web browser, and is therefore able to access the IP address from which an applet was downloaded. Other mobile code execution engines or runtime systems may be implemented, for example, as web browser plug-ins, which do not have access to such information. Because such systems are not as tightly integrated with the Web browser, they may only have access to the host name from which an applet was downloaded, rather than the IP address. Thus, such systems cannot use the same approach to preventing DNS spoofing attacks that is used in Java.

SUMMARY OF THE INVENTION

In view of the above, it would be desirable to provide a system and methods that permit mobile code to access resources on the Internet without exposing systems that execute the mobile code to a DNS spoofing attack.

It would further be desirable to provide a system and methods that permit an applet to access network resources on computers other than the computer from which the applet was downloaded, while preventing DNS spoofing attacks from succeeding.

It would also be desirable to provide a system and methods that permit an execution or runtime system that is not tightly integrated with a web browser to allow applets to make connections to other computers, while preventing DNS spoofing attacks.

In accordance with the present invention, to create a network connection between an applet that was downloaded from an applet home site, and a content server computer, a name directory on the content server computer is checked for the presence of a file or other indicator that applets from that applet home site are permitted to create a connection to the content server. If such a file is present in the name directory, the applet is allowed to create the network connection. If not, then the applet is not permitted to establish a network connection to the content server.

In a preferred embodiment, the files in the name directory on the content server have names that correspond to the names of the applet home sites from which applets that are permitted to make network connections with the content server were downloaded. Thus, if applets downloaded from "www.example.com" are permitted to access a content server, that content server would include a name directory containing a file named "www.example.com".

In a preferred embodiment of the present invention, applets or other mobile code run under an execution engine that performs the necessary checks and restricts the ability of applets to create network connections. To check for the presence of a file in the name directory on a content server, network restriction software in the execution engine generates a Uniform Resource Locator (URL) that points to the proper file name in the name directory, and uses that URL with standard HTTP requests, such as an HTTP HEAD-request or HTTP GET-request, to check for the presence of a file in the name directory.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1A:
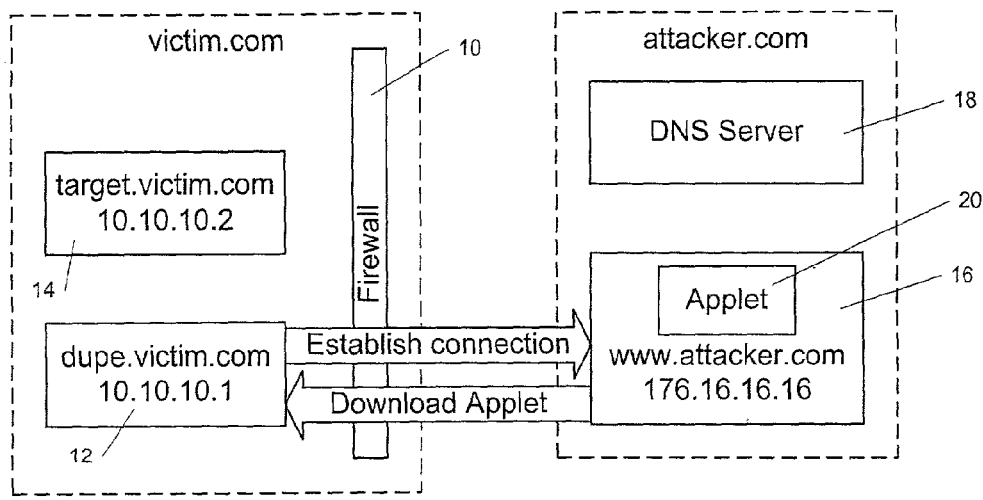
FIGS. 1A–1C are diagrams illustrating a DNS spoofing attack.
Figure 1B:
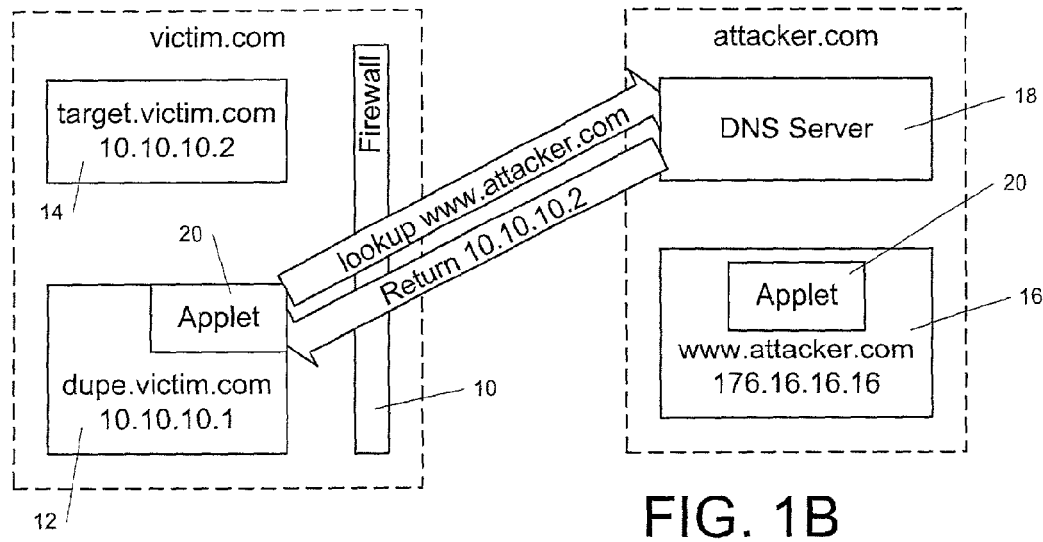
Figure 1C:
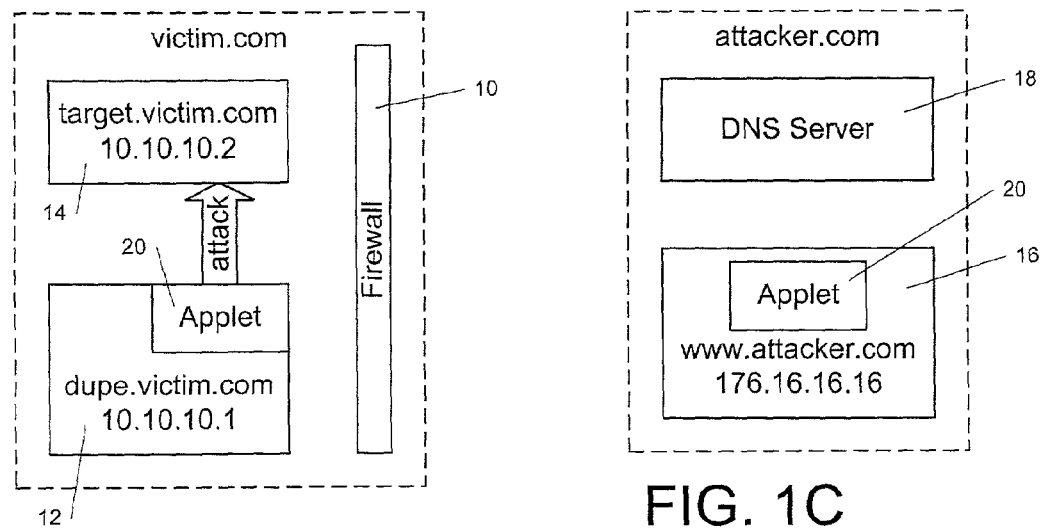

Referring to FIGS. 1A–1C, an example of a DNS spoofing attack on computers located behind a firewall is described. As seen in FIG. 1A, the victim network for this attack, victim.com, has (at least) two computers located behind firewall 10. First victim computer 12 has, for example, a host name of dupe.victim.com, and has an IP address of 10.10.10.1. Second victim computer 14, which is the actual target of the attack, is named target.victim.com, and has an IP address of 10.10.10.2. Both of victim computers 12 and 14 access the Internet only through firewall 10, which prevents unauthorized network connections from computers outside of firewall 10 from being made with computers that are behind firewall 10. First victim computer 12 is operated by a user, who may use first victim computer 12 to connect to web sites that are outside of firewall 10. Second victim computer 14, which is the target of the attack, may contain valuable data, or may provide services that may cause harm if disrupted. Due to the value of the data stored on second victim computer 14, or the services it provides, second victim computer 14 is normally permitted to accept network connections only from trusted computers behind firewall 10, including first victim computer 12.

The attacker in this example provides Web content from Web server 16 at www.attacker.com, having an IP address of 172.16.16.16. The attacker also controls, or has subverted, DNS server 18, which resolves names within the "attacker.com" domain. The attacker places an applet on Web server 16, that is downloaded and executed when a user accesses web pages from Web server 16.

It will be understood that all names and addresses used herein are examples only, and do not refer to any actual computer. Any similarity between the names and IP addresses used herein and any names or IP addresses actually in use on the Internet are coincidental, and are not intended to indicate any connection with the actual users of such names or IP addresses.

For the attack to proceed, the user of first victim computer 12 accesses a web page from Web server 16. Because first victim computer 12 is initiating the network connection, content from Web server 16, including applet 20, can be sent through firewall 10, to first victim computer 12. As seen in FIG. 1A, when first victim computer 12 accesses the web page from Web server 16, applet 20 is also downloaded to first victim computer, and is executed.

Referring now to FIG. 1B, when applet 20 is executed, it attempts to establish a network connection back to "www.attacker.com", which is outside of the firewall. This may appear to be a legitimate attempt to access resources available over the Internet. Since the applet does not seem to be accessing any protected computers within the firewall, this request will not seem to pose a security threat. Even under mobile code systems that permit an applet to connect only with a computer having the same name as the computer from which the applet was downloaded, this connection will be allowed. However, since the attacker controls (or was able to subvert) DNS server 18, instead of returning a correct IP address for "www.attacker.com", DNS server 18 returns the address 10.10. 10.2—the address of second victim computer 14. Thus, as shown in FIG. 1C, instead of creating a connection with "www.attacker.com", applet 20 creates a connection with second victim computer 14. Applet 20 can then use that connection to launch attacks based on known security holes against second victim computer 14, without having to circumvent firewall 10, or can download sensitive data from second victim computer 14.

It should be noted that this attack or similar attacks can work under a variety of rules restricting the ability of applets to create network connections with other computers. In the example described with reference to FIGS. 1A–1C, the attack will succeed even if a rule permitting applets to create connections only with a computer having the same name as the computer from which the applet was downloaded is used. Another restriction rule might allow an applet to create a connection with a computer only if there is overlap in the IP address lists returned by a DNS server for the computer from which the applet was downloaded and the computer with which the applet is attempting to create a connection. This restriction is also susceptible to a DNS spoofing attack, since it relies on information returned by a DNS server that is not behind the client's firewall. In general, most any restriction rule that relies primarily on information provided by a DNS server that is not behind the client's firewall may be subject to a DNS spoofing attack.

To prevent this type of attack, Java, a popular mobile code system, permits applets to make network connections only to a computer having the same IP address as the computer from which the applet was downloaded. While this is effective in preventing DNS spoofing attacks, it is a somewhat severe restriction on the ability of applets to access resources over a network, and is difficult to implement on systems where the execution engine or runtime system for the mobile code is not tightly integrated with a web browser.

In accordance with the present invention, such an attack can be prevented without unduly restricting the ability of applets or other mobile code to access resources available on the Internet, by insuring that an applet may only initiate a network connection with a computer if that computer includes a directory, file, or other indicator in which the host name of the computer from which the applet was downloaded is present. Such an arrangement is described with reference to FIG. 2.

Figure 2:
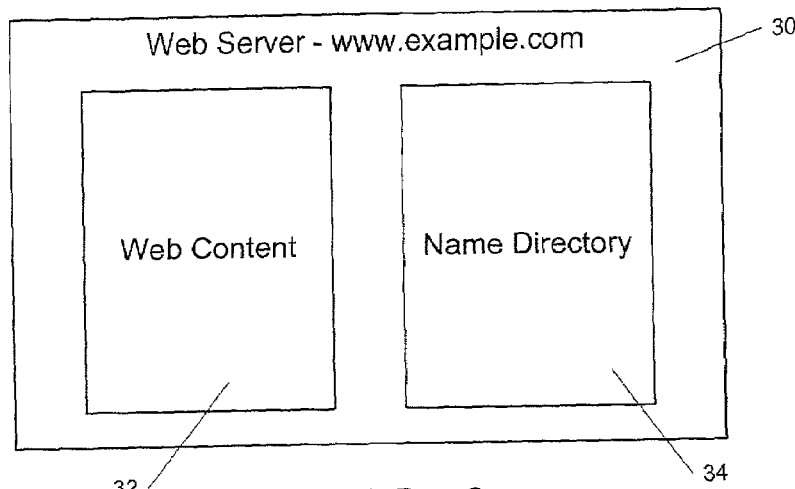
FIG. 2 is a diagram of a content server in accordance with the principles of the present invention.

In FIG. 2, Web server 30, having a host name of "www.example.com", provides access to a variety of Web content 32, such as Web pages and applets. Web server 30 may also provide services that may be accessed by applets or mobile code running on client computers. Access to such services may be granted without opening the content 32 to a DNS spoofing attack, through use of name directory 34.

In accordance with the principles of the present invention, name directory 34 is a directory on Web server 30, that can be accessed over a network. Whenever an applet wishes to establish a connection with Web server 30, the execution engine or runtime system in which the applet executes first checks to see if the name of the computer from which the applet was loaded is present in name directory 34 on Web server 30. If so, then the connection can be established. If not, then the applet is not permitted to establish a connection with Web server 30.

Name directory 34 preferably has a standard, known directory name, so it can be readily accessed. Optionally, applets may provide an instruction or advisory, telling the mobile code system where in the content server's file system the name directory might be found. This instruction might be a variable binding, a pathname string, or some other language construct.

Additionally, name directory 34 preferably is accessible via a standard HTTP (HyperText Transfer Protocol) request, so that its contents can be checked by making a standard HTTP request using a URL (Uniform Resource Locator), such as "http://www0.example.com/name-directory/www1.example.com", in which the end of the URL is the file name in the name directory, and matches the host name of the computer from which the applet was loaded (hereinafter, the "applet home site"). Thus, in this example, a check is being made to see if an applet downloaded from www1.example.com may create a connection with www0.example.com. Use of such a URL permits standard network protocols and services to be used to check whether a connection may be established. In a preferred embodiment, a standard HTTP HEAD-request may be used to check for the presence of the appropriate file in the name directory. Alternatively, an HTTP GET-request may be used.

Name directory 34 should preferably be configured to refuse directory listing requests, to prevent network mapping attacks. Because name directory 34 contains the names of computers that are preferably closely related to Web server 30 (i.e., they are aliases, or part of a group of computers whose content comprises a single web site), an attacker may be able to determine useful information about the configuration of the network to which the Web server 30 is connected by obtaining a directory listing of name directory 34.

Figure 3A:
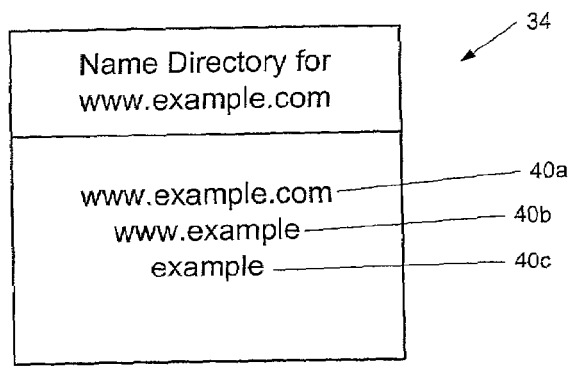
FIGS. 3A–3B is a diagram of a name directory in accordance with the principles of the present invention.

Referring now to FIG. 3A, a more detailed view of name directory 34 is shown. Name directory 34 may contain zero or more files, each having a file name indicating an alternative host name for the computer on which the name directory is located, or otherwise specifying the host name of a computer whose applets are permitted to create connections with the computer on which the name directory is located (hereinafter, the "content server"). Such files or other constructs that are used to specify the entries in a name directory shall be referred to hereinafter as "hostname files" or "hostname entries".

In FIG. 3A, name directory 34 contains hostname file 40a, having the name "www.example.com". Thus, applets from www.example.com are permitted to establish connections to www.example.com, because its name directory contains hostname file 40a. In addition to hostname file 40a, name directory 34 also contains hostname files 40b and 40c, which represent standard synonyms for "www.example.com", which would typically be used within the "example.com" domain. It should be noted that since hostname files 40a–40c are typically used only for their names, they can be empty files. Use of empty files in name directory 34 helps ease-of-use, since administrators of Web servers that use a name directory do not need to be concerned about the contents of the files in the name directory.

Figure 3B:
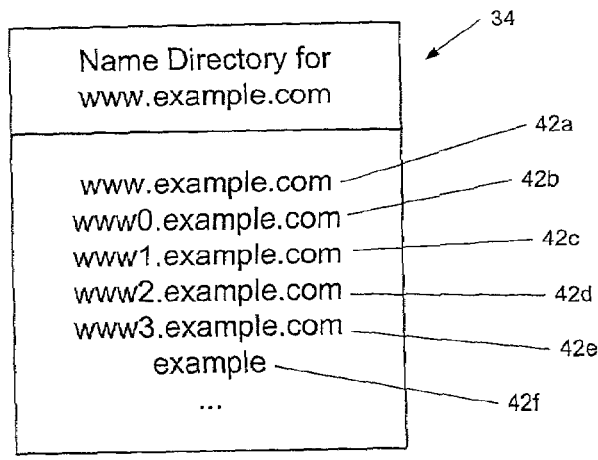

In FIG. 3B, a name directory 34 contains hostname files 42a–42f, each having a different name. It is possible that multiple host names may all refer to the same computer, or that all of the named computers may serve content for the same logical web site. By placing multiple hostname files in name directory 34, applets originating from any of the named computers of hostname files 42a–42f are permitted to access the computer on which name directory 34 is located. Thus, an applet having a home site of "www.example.com" or "www3.example.com" could access the content server on which name directory 34 is located, but an applet having a home site of "badname.example.com" could not.

A name directory, such as name directory 34, should be present on each computer with which an applet should be able to create a network connection. In the case of computers that "mirror" each other to create multiple sources for a logical web site, each such computer should have in its name directory an entry for the name of the logical web site. The name directories of such "mirror" computers may also have other entries, such as entries for their own host names.

It will be understood by one skilled in the relevant arts that name directory 34 could be implemented using a variety of constructs. In a preferred embodiment, a directory existing in a file system of the content server is used, and empty files in that directory are used as hostname files. Alternatively, instead of using a directory containing empty files with names matching the appropriate host names, name directory 34 could be a file, containing a list of the host names from which applets are permitted to make connections to the content server (i.e., the hostname entries are entries in a list). Name directory 34 could also be implemented using database records, or by other means of storing such data in a manner that permits it to be accessed over a network.

It will further be recognized by one skilled in the arts that the hostname files or entries contained in name directory 34 need not be empty. They could, for example, contain information on what types of network connections are permitted with the content server. Thus, a name directory containing the hostname file "www.company.com" could use that file to specify that only FTP (File Transfer Protocol) connections are permitted from applets having a home site of "www-.company.com". This could be achieved, for example, by placing key-value pairs in the hostname file. For instance, a hostname file containing the key-value pair "Protocol: FTP", might indicate that FTP connections are permitted. It will be recognized that, as above, storage means other than a directory could be used to contain hostname files including such information.

It should be noted that although the name directory of the present invention could be used essentially as an "access list", listing all the computers whose applets may access the computer on which the name directory is present, the name directory is preferably not used in such a manner. Preferably, the only hostname files or entries present in the name directory correspond to computers that are "related" to the content server, either as alternative names for the content server, or as other computers that form a single "logical" web site, which includes both the content server and the applet host computer. The preference that the name directory not be used as an access list is to enhance security. Accesses lists, once they are configured, are often neglected by system administrators, who sometimes do not properly remove old or disused names. Although not required in all embodiments, in preferred embodiments of the present invention, an address check, described more fully hereinbelow, helps prevent the directory list from being used as an access list.

Advantageously, the name directory provides an easy to use interface for administrators of content servers. To site administrators, the name directory appears to be a narrowly focused list of applet home sites whose applets may be given access to content servers. While it may appear that this mechanism protects the content servers from being accessed by applets running on client computers, in fact, the name directory mechanism of the present invention protects only sensitive data on the client's own network from externally-served hostile applets. No general protection of all remote content is afforded. The simplicity of placing names in the name directory effectively hides this distinction from users, programmers, and site administrators.

Figure 4:
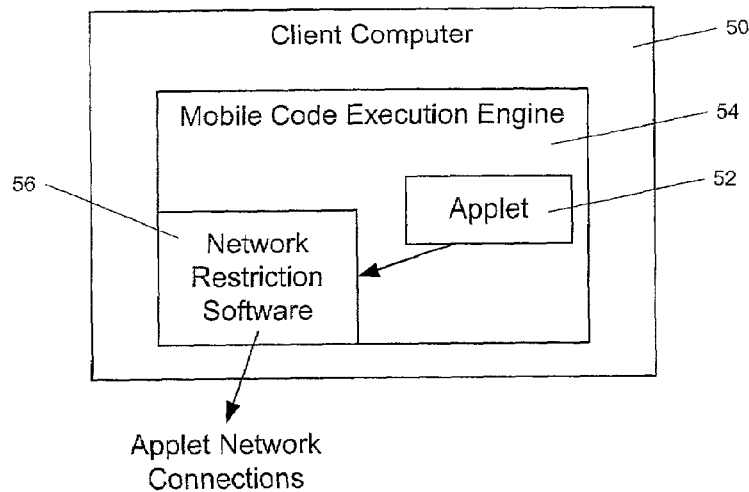
FIG. 4 is a diagram showing use of an execution engine and network restriction software in accordance with a preferred embodiment of the present invention.

Although a name directory in accordance with the present invention is used on a server computer, with which applets running on client computers will make network connections, the software that checks the contents of the name directory, and either permits or denies applets the ability to make network connections, is preferably executed on the client computers, though an embodiment in which the check is performed by a server is also possible. As shown in FIG. 4, client computer 50 runs applet 52 by using an execution engine 54. Running an applet within an execution engine, such as execution engine 54, is typical for mobile code systems, and typically permits applets to be machine independent, so they may be executed on different types of computers or operating systems, as long as any computer on which the applet is to be used is capable of running the execution engine in which the applet is executed.

Use of an execution engine also permits mobile code, such as applet 52, to have its ability to access resources on client computer 50 limited. For example, because applet 52 is executed by execution engine 54, execution engine 54 may restrict applet 52 from accessing files on client computer 50. Similarly execution engine 54 may restrict the ability of applet 52 to establish network connections with other computers.

In accordance with the principles of the present invention, execution engine 54 includes network restriction software 56, which is the only software through which applets executed by execution engine 54 are able to establish network connections with other computers. Network restriction software 56 permits applets to connect with other computers only after first checking that a name directory on the computer with which a connection is to be established contains a hostname file whose name matches the home site of the applet. If no such file or directory is present, execution engine 54 will not allow an applet to establish the connection.

Figure 5:
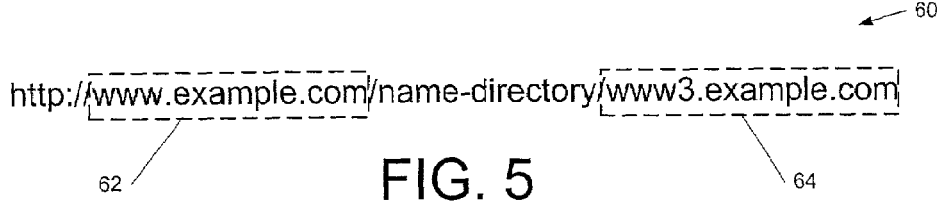
FIG. 5 shows a Uniform Resource Locator (URL) generated in accordance with a preferred embodiment of the present invention.

As shown in FIG. 5, in a preferred embodiment, this check is performed by attempting to access a URL, such as URL 60, in which file name 64 at the end of the URL is the home site of the applet, and host name 62 is the name of the content server. For example, if an applet having a home site of "www3.example.com" attempted to create a network connection with "www.example.com", as in FIG. 5, execution engine 54 would attempt to access "http://www.example.com/name-directory/www3.example.com". If execution engine 54 was successful at accessing the file, then it would allow the applet to create a network connection with www.example.com. If the file or directory is not found on www.example.com, the execution engine will refuse to allow the connection. As noted hereinabove, in a preferred embodiment, this check can be made using a standard HTTP HEAD-request using the URL described above.

In a preferred embodiment, the hostname file check and the connection between the applet and the other computer use the same IP address. For example, if the HTTP HEAD-request that is used to access URL 60 uses an IP address of 20.20.20.1 to access "www.example.com", then, when the applet creates a connection with "www.example.com", using an HTTP GET-request, for example, it uses the IP address 20.20.20.1. This restriction may be implemented by looking up the address of a computer to which a connection is being made using DNS, and then using that address to perform the HTTP HEAD-request, and to create any subsequent connection with the content server. This additional restriction prevents the address of the computer to which the connection is being made from changing between the hostname file check and the creation of the connection.

Additionally, a preferred embodiment of the network restriction software of the present invention performs additional address checks, that attempt to ensure that the computer to which a connection is being created is "related" to the computer from which the applet was downloaded. In a preferred embodiment, this is achieved by comparing a list of addresses returned by DNS for the content server with an address list for the applet home site, to guarantee that the address list for the content server is a subset of an address list for the applet home site. Note that a host name may be associated with numerous addresses, so this address check is less restrictive than requiring that the IP addresses match, but is more restrictive than just checking the name directory. This additional address check may help detect attempted DNS spoofing attacks, since such an attack will typically result in the address list for the content server (for which the actual address has been replaced) containing addresses that are not in the address list for the applet home site. Additionally, this address check helps ensure that the name directory mechanism of the present invention is not used as a kind of "access list", but rather is used to specify the names of computers that are related to the content server, such as computers that form a logical web site, including both the applet home site and the content server.

An additional address check that may be used in a preferred embodiment of the network restriction software of the present invention requires that the IP address of the applet home site be identical to the IP address of the content server if a "dotted quad" type address is used to specify the "name" of the applet home site. When a "dotted quad" form, such as "20.20.20.1" is used instead of a host name to specify the computer from which the applet is downloaded, then there is no host name that can be looked up in the name directory, and the name directory mechanism of the present invention may not apply. In such cases, which are generally uncommon, it is still possible to prevent DNS spoofing attacks by requiring that the IP address of the applet home site (which is all we have—we don't have a name for the site) is the same as the address of the content server.

Advantageously, since the execution engine running on the client is responsible for checking for the hostname file in the name directory, it is not necessary to run any special software on the server to restrict access. Any standard Web server software may be used on a server that will permit connections from applets. Additionally, since in the preferred embodiment, a standard HTTP request using a standard URL is used to perform the check, there is no need to implement any special protocols or network services to restrict access.

It will be understood that the path name used to access the name directory should be kept consistent, so that an execution engine will know where to look for the hostname files. However, the name directory need not be called "name-directory", which is used herein for example purposes only. For instance, in an implementation of the system and methods of the present invention for use with mobile code written in the Curl content language, the name directory is called "curl-hostnames", rather than "name-directory". As discussed hereinabove, an applet may optionally provide to the network restriction software an instruction or advisory, telling the network restriction software where in the content server's file system it should look for the name directory. Such an instruction or advisory may be provided through use of a programming language construct, such as a variable binding, a pathname string, or other language constructs that may be used in an applet.

Figure 6:
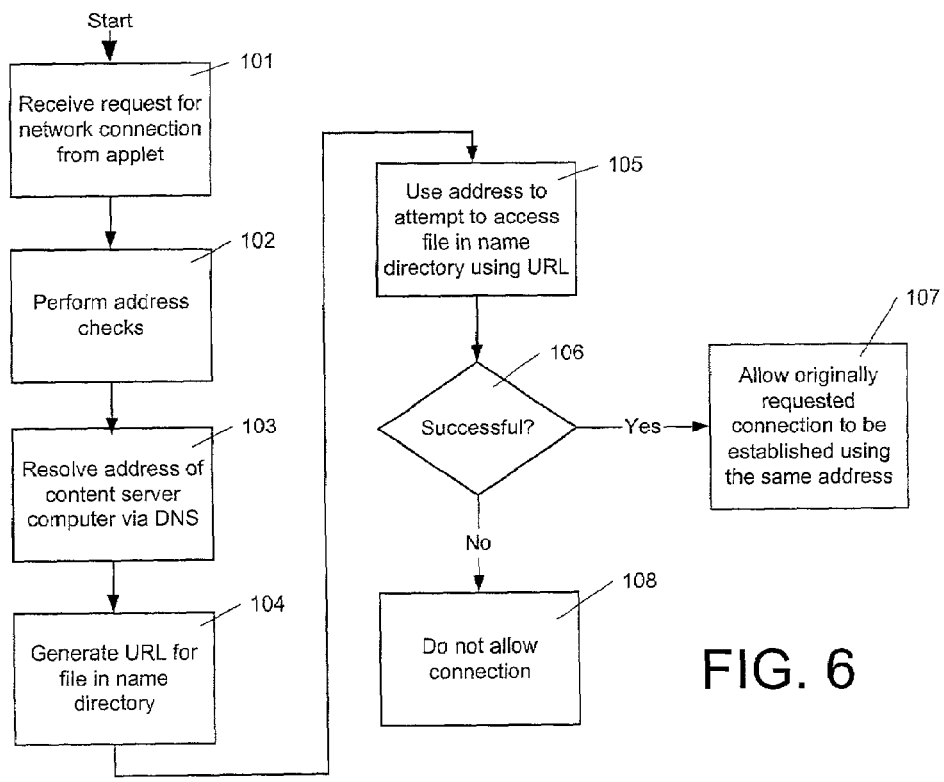
FIG. 6 is a flowchart of a preferred embodiment of the network restriction software of the present invention.

Referring now to FIG. 6, a flowchart showing the operation of a preferred embodiment of network restriction software 56 is described. At step 101, a request to create a network connection is received from an applet. Preferably, all attempts by applets to create connections to other computers over a network are processed through the network restriction software of the execution engine under which the applets execute.

At step 102, address checks are performed to determine whether the network restriction software should proceed with the name directory check. If the applet home site name is a "dotted quad" form address, then the name directory check does not proceed, and a connection is allowed if the content server address matches the applet home site address. In a second address check, the list of addresses associated with the content server is checked to make sure it is a subset of the list of addresses associated with the applet home site. If so, then the name directory check may proceed. If not, the connection is not allowed. These address checks are used in a preferred embodiment, but may optionally be omitted in some embodiments of network restriction software designed in accordance with the present invention.

At step 103, the network restriction software resolves the address for the host name of the computer to which a connection has been requested. This typically involves using DNS to acquire one or more addresses for the host name of the content server computer. It should be noted that in some embodiments, this step may be combined with step 102, since these addresses may be needed for the address checks of step 102.

At step 104, the network restriction software generates a URL for the hostname file in the name directory that must be checked before a network connection will be allowed. This is preferably done by using the host name of the computer with which the connection is to be made as the host name for the URL, and appending the pathname of the name directory and the home site of the applet (i.e. the site from which the applet was downloaded), which corresponds in a preferred embodiment to the name of the hostname file.

In step 105, the network restriction software attempts to access the URL that was generated at step 104, using the address that was determined at step 103. The URL points to a hostname file in the name directory that has a name matching the host name of applet's home site. If the attempt to access the URL was successful (step 106), then, in step 107, the applet is allowed to establish a network connection using the same address that was used to access the URL in step 105. Otherwise, at step 108, the network restriction software prevents the applet from establishing a network connection.

Figure 7A:
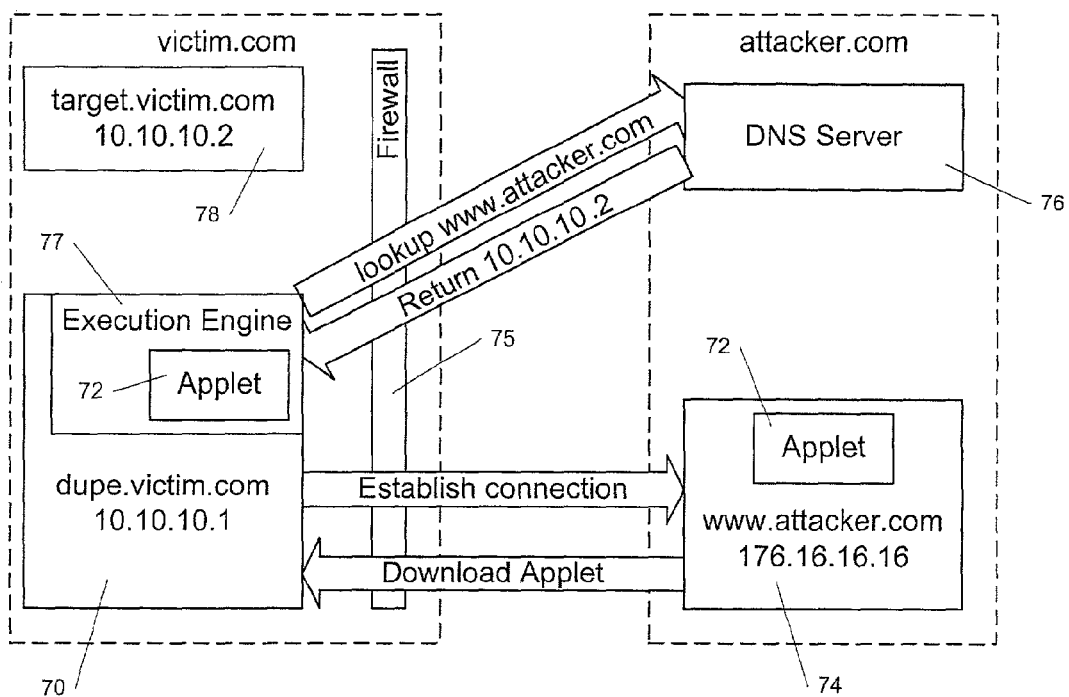
FIGS. 7A–7B demonstrate use of the system and methods of the present invention to prevent a DNS spoofing attack.
Figure 7B:
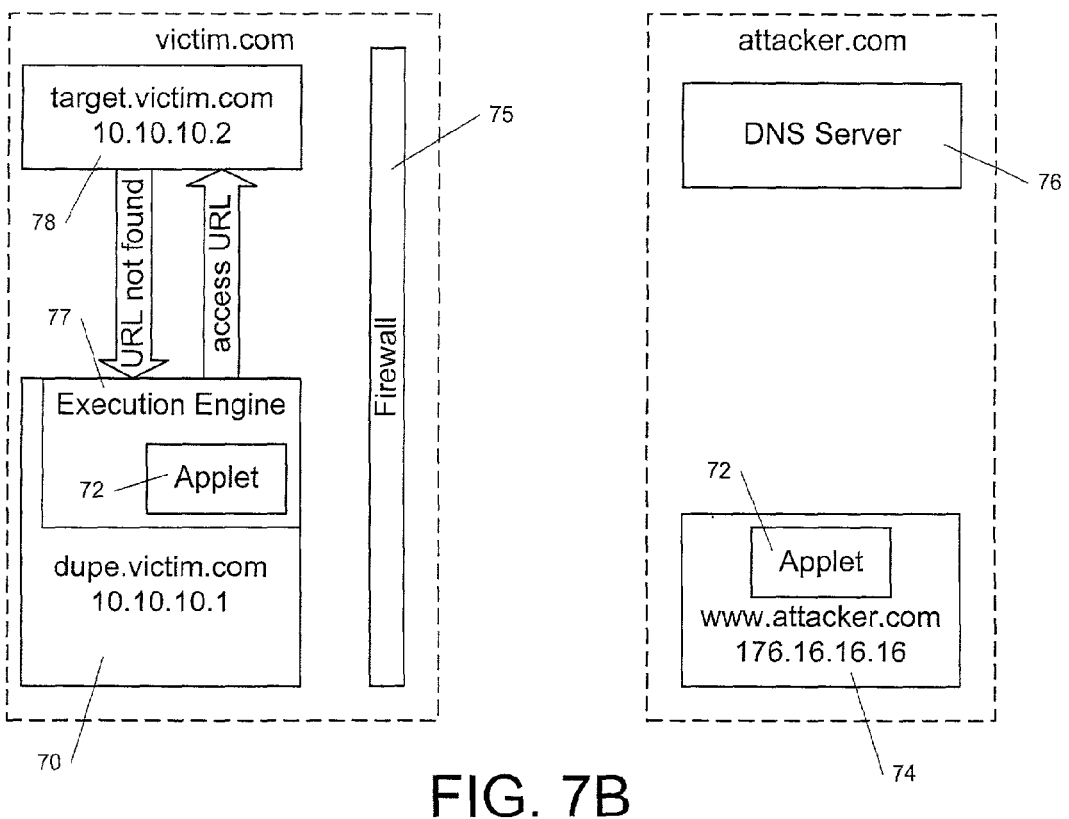

As shown in FIGS. 7A–7B, application of the present invention prevents a DNS spoofing attack of the type shown with reference to FIGS. 1A–1C. Referring to FIG. 7A, as in the earlier example, first victim computer 70, which is behind firewall 75, downloads applet 72 from server 74 (so the applet's home site is "www.attacker.com") and executes the applet. Also as before, applet 72 attempts to create a network connection with "www.attacker.com", resulting in a request to DNS server 76. DNS server 76, which has been subverted by the attacker, returns the address of second victim computer 78 (10.10.10.2) as a response.

As seen in FIG. 7B, in accordance with the principles of the present invention, execution engine 77, which is running applet 72, attempts to access the URL "http://www.tar9et.victim.com/name-directory/www.attacker.com" on second victim computer 78. Since second victim computer 78 was not intended to respond to the name "www.attacker.com", the file "www.attacker.com" is not found in the name directory (if such a directory even exists on second victim computer 78), and execution engine 77 prevents applet 72 from creating a network connection with second victim computer 78, avoiding the attack.

It should be noted that using a name directory in accordance with the present invention effectively provides a source of name-to-name relationships that is controlled by the content server. It is necessary for an attacker to spoof both DNS and the name directory mechanism of the present invention to use the equivalent of a DNS spoofing attack. While this can be done on sites outside of a client's firewall, it is extremely difficult to spoof the name directory mechanism of the present invention inside a client's firewall, if the firewall and internal DNS servers are securely configured.

Advantageously, the client's network restriction software does not need to know whether an applet's requested content server is inside or outside of the client's firewall. The client may believe the accuracy of all name directory checks, but only really cares about the accuracy of checks performed on content servers that happen to be behind the client's own firewall, since these are often the target machines for a DNS spoofing attack. A client can, and should, trust name directory checks performed on computers behind his own firewall, assuming that the firewall and any internal DNS servers are properly configured. If an attacker can affect the contents of the name directories of content servers behind the client's firewall, then the client has more severe security problems than are addressed herein, and may be subject to more direct attacks than hostile applets.

Figure 8:
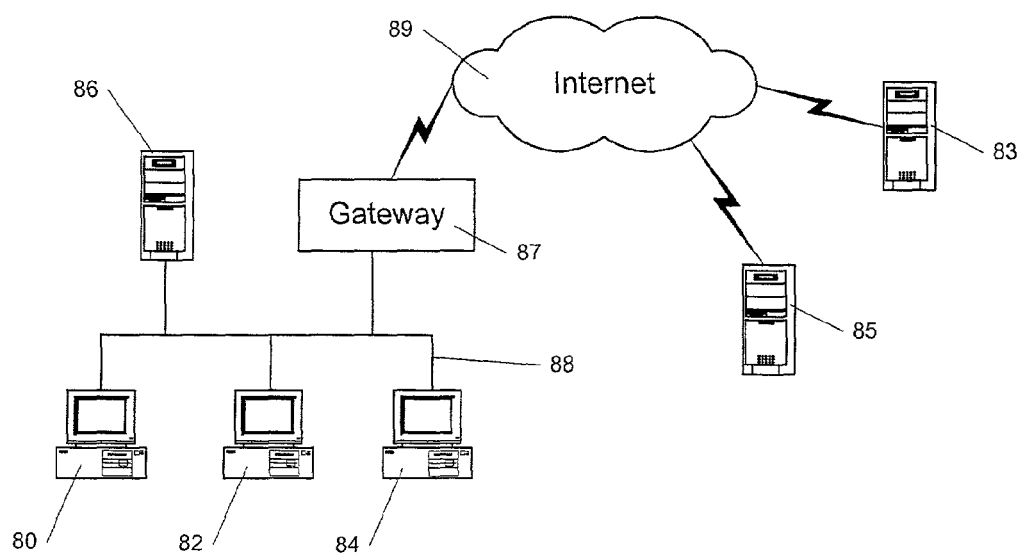
FIG. 8 is a diagram of a network environment suitable for use with the system and methods of the present invention.

Referring now to FIG. 8, an example of a computing environment in which the system and methods of the present invention may be used is described. Computers 80, 82, and 84, and server 86 are connected to one or more local area networks, such as local area network (LAN) 88. Each of computers 80, 82, and 84 may execute a variety of software, all or part of which may be stored locally on computers 80, 82, or 84, or may be stored on server 86, and accessed over LAN 88.

LAN 88 is connected to a wide area network (WAN) 89, such as the Internet, through gateway 87, which may be a dedicated device, or may be a computer or server, similar to computers 80, 82, and 84, or server 86. Additionally, gateway 87 may provide the functions of a firewall, preventing unauthorized network connections from being established with computers on LAN 88 from computers outside of LAN 88.

By sending communications across WAN 89, any of the devices connected to LAN 88 may communicate with remote servers 85 and 83, as well as other computers or devices that can be accessed over WAN 89. Computers 80, 82, and 84 may gain access to information and software through WAN 89, including applets or other mobile code.

Such applets may, for example, be stored on remote server 85, and may be accessed by any of computers 80, 82, or 84, which may transfer the applet from remote server 85, so as to execute the applet locally.

Each computer or device accessible through WAN 89 has a name, and a numerical address. Some of the computers or devices which may be accessed through WAN 89 have multiple names which refer to the same numerical address, or may have multiple numerical addresses and multiple names. The names of devices connected to WAN 89 can be translated into corresponding numerical addresses by a set of DNS servers (not shown) connected to WAN 89.

It will be understood by one skilled in the art that the network configuration shown in FIG. 8 is for illustration only, and that most any network configuration may be used with the system and methods of the present invention. Further, it will be understood that many types of devices may be connected to LAN 88, including printers (not shown), storage devices (not shown), and other types of devices that may be connected to a network.

Figure 9:
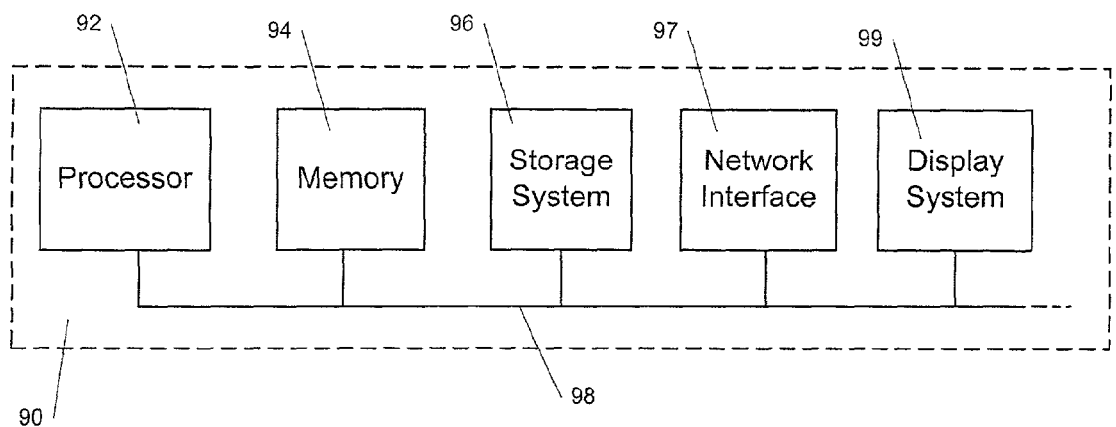
FIG. 9 is a diagram of a computer system suitable for use with the system and methods of the present invention.

Referring now to FIG. 9, a block diagram of a computer system suitable for use with the present invention is described. Computer system 90 includes at least a processor 92 for processing information according to programmed instructions and a memory 94, for storing information and instructions for processor 92. Additionally, computer system 90 may optionally include a storage system 96, such as a magnetic or optical disk system, for storing instructions and information on a relatively long-term basis. Computer system 90 also may include a network interface 97, and a display system 99, such as a video controller and monitor, on which information may be displayed. Processor 92, memory 94, storage system 96, network interface 97, and display system 99 are coupled to a bus 98, which preferably provides a high-speed means for devices connected to bus 98 to communicate with each other.

It will be apparent to one of ordinary skill in the art that computer system 90 is illustrative, and that alternative systems and architectures may be used with the present invention. It will further be understood that many other devices, such as an audio output device (not shown), and a variety of other input and output devices (not shown), such as keyboards and mice, may be included in computer system 90. Computer system 90 may be a personal computer system, a workstation, a set-top box designed to be connected to a television or other similar display, a hand-held device, such as a cell phone or personal digital assistant, or any other device that contains a processor capable of executing programmed instructions and a memory capable of storing programmed instructions.

Those skilled in the art should readily appreciate that the programs defining the operations and methods defined herein are deliverable to a computer in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable out of a memory by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware and software components.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of creating a network connection between an applet executing on a client computer and a content server computer, the method comprising:
   determining a home site name for the applet, the home site name corresponding to a host name of a computer from which the applet was downloaded to the client computer;
   checking for the presence of a hostname entry in a name directory on the content server computer, the hostname entry corresponding to the home site name for the applet;
   permitting the applet to create a network connection with the content server computer if the hostname entry was present in the name directory on the content server computer; and
   denying permission for the applet to create a network connection with the content server computer if the hostname entry was not present in the name directory on the content server computer.

2. The method of claim 1, wherein checking for the presence of a hostname entry in a name directory on the content server computer comprises:
   generating a Uniform Resource Locator for the hostname entry on the content server computer; and
   sending an HTTP request using the Uniform Resource Locator to the content server computer to determine whether the hostname entry is present in the name directory on the content server computer.

3. The method of claim 2, wherein generating a Uniform Resource Locator comprises combining a host name of the content server computer, a path name of the name directory, and a name of the hostname entry.

4. The method of claim 2, wherein sending an HTTP request using the Uniform Resource Locator comprises sending an HTTP HEAD-request using the Uniform Resource Locator to the content server computer to determine whether the hostname entry is present in the name directory on the content server computer.

5. The method of claim 2, further comprising looking up an address of the content server.

6. The method of claim 5, wherein checking for the presence of a hostname entry in a name directory on the content server computer comprises using the address of the content server to check for the presence of the hostname entry, and wherein permitting the applet to create a network connection with the content server computer if the hostname entry was present comprises using of the content server to create the network connection with the content server.

7. The method of claim 1, wherein an execution engine executes the applet on the client computer, and wherein checking for the presence of a hostname entry in a name directory of the content server computer comprises using network restriction software in the execution engine to check for the presence of the hostname entry.

8. The method of claim 1, wherein checking for the presence of a hostname entry in a name directory on the content server computer comprises using a consistent path name for the name directory.

9. The method of claim 8, wherein checking for the presence of a hostname entry in a name directory on the content server computer comprises using an instruction from the applet on a path name for the name directory.

10. The method of claim 9, wherein using an instruction from the applet on a path name for the name directory comprises using a language construct to determine the path name for the name directory.

11. The method of claim 1, further comprising using the hostname entry to determine types of network connections that are permitted between the applet and the content server computer.

12. The method of claim 1, wherein checking for the presence of a hostname entry in a name directory on the content server computer comprises checking for the presence of a file in the name directory that has a file name identical to the home site name for the applet.

13. The method of claim 1, further comprising performing an address check.

14. The method of claim 13, wherein performing an address check comprises:
   determining an address list for the content server computer;
   determining an address list for the computer from which the applet was downloaded; and
   denying permission for the applet to create a network connection with the content server computer if the address list for the content server computer is not a subset of the address list for the computer from which the applet downloaded.

15. The method of claim 13, wherein performing an address check comprises denying permission for the applet to create a network connection with the content server computer if the home site name for the applet is in dotted quad form, and an address specified by the dotted quad form is not identical to an address for the content server computer.

16. A client computer system that executes an applet that was downloaded from an applet home site, the client computer system comprising:
   a processor that executes programmed instructions; and a memory that stores a plurality of programmed instructions, including programmed instructions for an execution engine that executes the applet, the execution engine including network restriction software that, when executed by the processor, causes the client computer to:
   receive a request from the applet to create a network connection with a content server computer;
   check for the presence of a hostname entry in a name directory on the content server computer, the hostname entry corresponding to a name of the applet home site;
   deny permission for the applet to create a network connection with the content server computer if the hostname entry was not present in the name directory on the content server; and
   permitting the applet to create a network connection with the content server if the hostname entry was present in the name directory on the content server.

17. The client computer system of claim 16, wherein the network restriction software causes the client computer to check for the presence of the hostname entry in the name directory file by:

generating a Uniform Resource Locator for the hostname entry on the content server computer; and sending an HTTP request using the Uniform Resource Locator to the content server computer to determine whether the hostname entry is present the name directory on the content server computer.

18. The client computer system of claim 17, wherein the HTTP request comprises an HTTP HEAD-request.

19. The client computer system of claim 17, wherein the Uniform Resource Locator comprises a host name of the content server computer, a path name of the name directory, and a name of the hostname entry.

20. The client computer system of claim 16, wherein the network restriction software further causes the client computer to look up an address of the content server.

21. The client computer system of claim 20, wherein the network restriction software causes the client computer to use the address of the content server to check for the presence of the hostname entry and to create the network connection with the content server if permission to create the network connection with the content server is not denied.

22. The client computer system of claim 16, wherein the name directory comprises a directory in a file system of the content server computer.

23. The client computer system of claim 22, wherein the hostname entry comprises an empty file in the name directory on the content server computer.

24. The client computer system of claim 16, wherein the name directory comprises a file on the content server computer.

25. The client computer system of claim 16, wherein the name directory on the content server computer has a consistent pathname.

26. The client computer of claim 16, wherein the applet provides instructions that determine a pathname for the name directory on the content server.

27. The client computer of claim 26, wherein the instructions that determine the pathname for the name directory on the content server comprise programming language constructs.

28. The client computer system of claim 16, wherein a name of the hostname entry is identical to a host name of the applet home site.

29. The client computer system of claim 16, wherein the hostname entry comprises information on the types of network connections that may be made between the applet and the content server computer.

30. The client computer system of claim 16, wherein the network restriction software further causes the client computer to perform an address check.

31. The client computer system of claim 30, wherein the network restriction software causes the client computer to perform the address check by:

determining an address list for the content server computer;

determining an address list for the computer from which the applet was downloaded; and denying permission for the applet to create a network connection with the content server computer if the address list for the content server computer is not a subset of the address list for the computer from which the applet was downloaded.

32. The client computer system of claim 30, wherein the network restriction software causes the client computer to perform the address check by denying permission for the applet to create a network connection with the content server computer if the home site name for the applet is in dotted quad form, the dotted quad form specifying an address, and the address specified in the dotted quad form is not identical to an address for the content server computer.

* * * * *

UNITED STATES PATENT AND TRADEMARK OFFICE
CERTIFICATE OF CORRECTION

PATENT NO. : 6,993,588 B2 Page 1 of 1
DATED : January 31, 2006
INVENTOR(S) : Donald T. Davis et al.

It is certified that error appears in the above-identified patent and that said Letters Patent is hereby corrected as shown below:

Column 13,
Line 60, "using of the content server" should read -- using the address of the content server --.

Column 14,
Line 35, "applet downloaded." should read -- applet was downloaded. --.

Column 15,
Line 5, "present the name" should read -- present in the name --.

Signed and Sealed this

Twenty-third Day of May, 2006

JON W. DUDAS
*Director of the United States Patent and Trademark Office*